May 29, 1956   H. M. RICHARDSON   2,748,028
GLASS FIBER PRODUCT AND PROCESS
Filed July 11, 1951
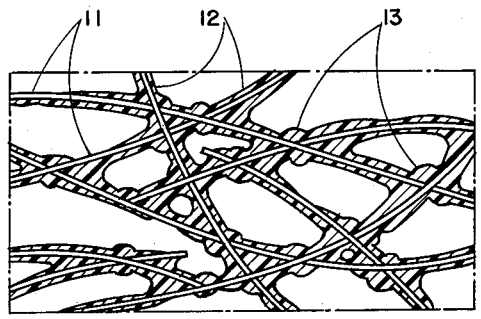
FIG. I
FIG. 2
HENRY M. RICHARDSON,
       INVENTOR.
BY

2,748,028

GLASS FIBER PRODUCT AND PROCESS

Henry M. Richardson, Springfield, Mass., assignor to Atlas Powder Company, Wilmington, Del., a corporation of Delaware Application July 11, 1951, Serial No. 236,137

13 Claims. (Cl. 117—126)

This invention relates to glass reinforced thermoset products and more particularly to intermediate structures suitable for the manufacture of such products.

It is an object of the invention to provide dry, resin bearing, glass fiber mats capable of being transformed directly by heat and pressure into reinforced thermoset masses.

A further object is to provide integral structures comprising glass fibers and solid polymerizable resin composition, in adherent relation thereto, in quantity sufficient that upon subjecting the structure to curing temperatures under pressure, the structure is converted to a hard, dense, glass-reinforced thermoset solid.

The above and other objects will become more apparent in the course of the following description and in the appended claims.

The value of glass fibers as reinforcing agent in plastics has been amply demonstrated in recent years and fiber glass reinforced plastics have made their appearance in diverse articles of commerce. The glass may be in the form of fabric woven from glass yarns, which fabric, in one or several layers, is impregnated with a thermoplastic resin and allowed to set or with a thermosetting resin and cured. More economically, and with greater flexibility of operation, glass fibers in comparatively short lengths may be formed into a loosely bonded felt, the felt impregnated with the resin in liquid form, and then solidified. The felts may be formed directly over shaped molds, or in flat sheets to be cut and laid up in molds for impregnation with the liquid resin.

By the present invention means are provided to utilize glass fibers as the reinforcing material in plastics in a manner which eliminates the use of liquid resins or fluid solutions of resins in the final molding thereof. The structures of the invention contain the reinforcing fibers and solid, uncured, polymerizable resin adhering to the fibers and cementing them together to form a superficially dry, pliable mat which may be fitted into molds of any desired shape and cured. The quantity of resin is sufficient that when the structure is subjected to the heat and pressure necessary for curing it flows together around the fibers to form a continuous phase with the fibers embedded therein, and when the cure is completed the resulting products are thermoset masses shaped to the molds and reinforced with the glass fibers of the said structures.

In the structures of the present invention the glass fibers may be any fibers suitable for use as reinforcing fibers in plastic compositions. Particularly well suited are multifilament fibers or strands such as those suitable for use in the manufacture of glass yarns and textiles. In the structures the fibers may be present in fabric form, having been spun and woven; or in the form of parallel strands of long fibers; or, preferably, they may be employed in comparatively short lengths, deposited in random arrangement to form a loose felt of interlaced fibers.

The drawings show in Figure 1, a structure of the invention in greatly magnified form, being a fragment in section of the interior of such a structure. The randomly oriented glass fibers 11 are irregularly coated with uncured, solid resin composition 12. At points of intersection between the fibers, as at 13, the said resin composition binds the fibers together whereby a coherent structure of some flexibility is formed.

Figure 2 illustrates the end product obtainable by subjecting the structure of the invention (Figure 1) to the influence of heat and pressure. Magnification is again resorted to to make the component parts of the article visible. The resin has melted, flowed together, and become thermoset, this difference from the uncured resin being indicated by designating it as 14 in the drawing. The glass fibers 11 are in closer spaced relation than in the structure of the invention, and are completely surrounded by and embedded in the resin phase. They serve to reinforce the solidified plastic mass, increasing greatly its flexural and tensile strengths.

The polymerizable resin components of structures of the present invention comprise the solid pulverulent linear polyesters described in applications Serials Nos. 92,746, now U. S. Patent No. 2,634,251; 190,239, now U. S. Patent No. 2,662,069 and 190,240, now U. S. Patent No. 2,662,070, filed May 11, 1949; October 14, 1950, and October 14, 1950, respectively, all being assigned to the assignee of the present invention.

Such a polyester is the esterification product, with melting point of at least 80° C., of an ethene dicarboxylic acid with a substantially stoichiometric quantity of a polyhydric alcohol selected from the groups consisting of (a) dihydric alcohols conforming to the formula

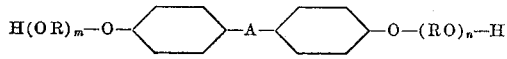

wherein R is an alkylene radical containing from 2 to 3 carbon atoms, A is a 2-alkylidene radical containing from 3 to 4 carbon atoms, $m$ and $n$ are each at least one, and the average sum $m+n$ is not over 3; and (b) mixtures consisting of at least 50 mol percent of a dihydric alcohol conforming to said formula, from 0 to 50 mol percent of a member selected from the group consisting of ethylene glycol, propylene glycol, and diethylene glycol, and from 0 to 10 mol percent of a polyhydric alcohol containing from 3 to 6 carbon atoms and at least 3 hydroxyl groups.

Polyesters of ethene dicarboxylic acids and polyols selected from the group hereinbefore defined in which minor proportions thereof have been replaced by other acids or other alcohols in order to modify the properties of the resins in known manner are likewise suitable for use in the structures of the present invention provided the modification is sufficiently minor in extent not to destroy the essential characteristics of the polyesters. These characteristics include sufficient friability to permit grinding to a powder at ordinary temperatures, and a melting point of at least 80° C., and preferably above 90° C.

Polyesters which come within the scope of the above definition and which are advantageously employed in practicing the invention include the fumarate of 2.2-di-(4 hydroxy propoxy phenyl)-propane, the maleate of 2.2-di-(4 hydroxy propoxyphenyl)-butane, the fumarate of a mixture comprising 96 mol per cent of 2.2-di-(4 beta hydroxy ethoxyphenyl)-propane and 4 mol per cent of glycerol, the fumarate of a mixture comprising 50 mol per cent 2.2-di-(4 hydroxy propoxyphenyl)-propane and 50 mol per cent of ethylene glycol, the maleate of the polyoxyethylene ether of 2-butylidene diphenol wherein both phenolic hydroxyls are oxyethylated and the average number of oxyethylene groups per mol of said diphenol is 2.6, and the like. It is to be understood that in the above named polyester products the indicated acid and polyol were reacted in essentially stoichiometric proportions and the esterification carried to the extent that the melting point of the product was above 80° C. and preferably above 90° C.

Structures of resin bearing glass fibers suitable for conversion to glass reinforced plastic mass by subjection to heat and pressure may contain one or more of the above described polyesters as the sole polymerizable resin component. Preferably, however, the polymerizable resin is a mixture of one or more of the said polyesters and a non-volatile polymerizable compound adapted to serve as a cross linking agent in the curing of the resin. Particularly useful as cross linking agents are the liquid allyl esters of polybasic acids among which may be named diallyl maleate, diallyl phthalate, triallyl phosphate, diallyl succinate, and the like. Other non-volatile liquids containing polymerizably reactive groups may likewise be employed as the cross linking agent. Among such liquids are diallyl phenyl phosphonate, allyldiglycol carbonate, dicrotyl ester of dibasic acids, diacrylates and dicrotonates of the lower glycols, and the like. The preferred group of cross linking agents comprises the diallyl esters of dibasic organic acids, diallyl phthalate being the preferred member of the group.

In the polymerizable resin component of a structure made in accordance with the present invention the maximum proportion of such liquid, non-volatile cross linking agent to polyester is limited only by the tendency of the uncured resin mixture to become increasingly tacky with increasing proportions of liquid to solid resin with a resulting decrease in convenience in handling the structures. The maximum amount of liquid to be tolerated in the mixtures varies with the polyester, the cross linking agent and the intended purposes for which the formed structure is to be used but, in general, amounts greater than 20% based on the sum of polyester and cross linking agent are to be avoided, and the preferred amount is from 5% to 10%. Operable polymerizable resin compositions include those containing smaller amounts of cross linking agent, down to vanishingly small amounts, since the polyesters employed in the invention are themselves thermosetting.

In addition to the fibers and polymerizable resin composition the structures of the present invention preferably include a curing catalyst for the resin. Suitable catalysts include benzoyl peroxide, lauroyl peroxide, tertiary butyl perbenzoate, and other organic peroxides, and "per" acid esters. Inorganic catalysts such as stannic chloride, cobalt nitrate, and the like may also be employed. The amount of catalyst in the structure will vary with the activity of the catalyst, the curing time required by the molding process and the reactivity of the particular resin composition in the structure. In general, however, from 0.25 per cent to 2.5 per cent of active catalyst ingredient based on the resin content will be found useful in the structures of the invention. It is highly desirable that the catalyst be well distributed throughout the polymerizable resin composition, and where a liquid cross linking agent is employed the catalyst is advantageously dissolved therein for introduction into the structure. If the resin is to be composed entirely of solid polyester the catalyst may be dissolved in a volatile liquid and sprayed onto the fibrous mat ahead of, or simultaneously with, the powdered solid polyester. Alternatively the catalyst may be dispersed through the powdered solid polyester by long tumbling prior to incorporation of the latter with the glass fibers.

In the structures of the invention the proportion of glass fibers to polymerizable resin composition may usefully range between the limits of 35 fiber to 65 resin and 65 fiber to 35 resin. Preferred structures contain from 45% to 55% of resin and from 55% to 45% of glass fiber.

The polymerizable resin is present in the structures in adherent relation to the glass fibers, which relation is conveniently brought about by incorporating the polyester in powder-to-granular form and the liquid cross linking agent (if present) in finely dispersed droplets with the glass fibers in random orientation and subjecting the incorporated mixture to a temperature above the melting point of the polyester but below the curing temperature of the resin composition for a sufficient time to fuse the polyester particles. The fused particles absorb any liquid cross linking agent which may be present into a substantial homogeneous resin phase which solidifies on cooling to room temperature. There is some coalescence of resin particles but the predominant effect is for the molten resin to flow over the glass fibers and collect at points of intersection between individual fibers to form upon cooling a structure of sufficient mechanical strength that it can be handled without disintegrating or shaking out the dry resin.

In the following examples glass fiber mats bonded with insufficient resin to be converted to a glass reinforced plastic mass without the addition of further resin are transformed into dry resin-bearing mats which can be so converted.

*Example I*

Bonded glass fiber mats weighing two ounces per square foot and made up of multifilament glass fibers of approximately 0.00038" diameter, cut into lengths of approximately 2½ inches, laid down in random orientation and bonded with 8% by weight of a cured coester of fumaric acid with 96 mol per cent of 2.2-di(4 beta hydroxy ethoxy phenyl)-propane and 4 mol per cent of glycerol was cut into strips 2½ inches by 6 inches. On one face of each strip approximately 0.7 gram of diallyl phthalate containing dissolved therein 0.07 gram of tertiary butyl perbenzoate was sprayed, and on the other face 6.6 grams of powdered polyester resin was sprinkled. The polyester resin was the fumaric acid polyester of a mixed diol comprising 50 mol per cent of 2.2-di(4 hydroxy propoxy phenyl)-propane and 50 mol per cent ethylene glycol, ground to pass a 30 mesh screen. The treated strips were heated under infra red lamps until the resin fused. The diallyl phthalate was largely absorbed into the fused particles of resin and on cooling to room temperature, resolidification occurred, resulting in a structure of glass fibers to which adhered a catalyzed polymerizable mixture of diallyl phthalate and polyester resin, which mixture was non-tacky, and somewhat flexible, lending strength to the structure as a whole.

16 plies of the resin bearing strips were laid up and compressed in a mold to a height of ½ inch and cured in a mold heated by 80 pound steam (324° F.) for 30 minutes. In the molded product the resin components had flowed together to form a continuous phase, and copolymerized to an insoluble, infusible mass heavily reinforced by the glass fibers. The surface was smooth and the plastic could be shaped by machining or sawing. It exhibited very high flexural strength and very low water absorption on immersion for 24 hours.

*Example II*

Employing the same bonded glass fiber mat as was employed in Example I, and the same manipulative technique as described therein a polymerizable resin bearing structure was formed in which each 2.5 x 6 inch ply was loaded with approximately 0.49 gram of diallyl phthalate and 4.4 grams of the fumaric acid ester of 2.2-di(4 hydroxy propoxy phenyl)-propane and the diallyl phthalate contained in solution 0.05 gram of tertiary butyl perbenzoate. In this structure the proportion of resin in the total structure is 45% by weight.

The resin bearing fibrous structure when molded into a plastic mass of half inch thickness had excellent flexural strength and very low water absorption.

In the above examples prebonded glass fiber mats were employed for convenience in handling. The bonding resin therein had been cured in the preparation of the mats and is not to be considered as part of the polymerizable resin of the structures of the invention. In the following examples the preparation of resin bearing fiber structures from glass fibers not pre-bonded into mats is described.

*Example III*

Six pounds of chopped strands of glass fiber averaging about 2½ inches in length and 0.00038 inch in diameter is introduced gradually into the upper portion of a closed cylindrical chamber by a brush roll. At the base of the chamber, which is about 6 feet in diameter is a turn table rotating at about 30 R. P. M. The center of the turn table is connected through duct work to a vacuum exhaust fan, and on the turn table is placed a 3 x 4 ft. screen to collect the deposited fibers and polymerizable resins. The screen is perforated with ⅛ inch holes on ³⁄₁₆ inch centers. When about 10% of the glass fibers have been admitted to the chamber, a solution of 10% benzoyl peroxide in diallyl phenyl phosphonate is sprayed into the upper part of the chamber to intermingle with the fibers, and finely ground fumarate of 2.2-di (4 beta hydroxy ethoxy phenyl)-butane is also blown into the upper part of the chamber. The rate of addition of these polymerizable components is adjusted so that when all of the glass fibers have been introduced there will have been added 3.4 pounds of polyester and 0.29 pound of the diallyl phenyl phosphonate solution. The screen and its mat of fibers with particles of resin suspended therein is heated beneath infra red ray lamps until the resin particles are fused, and then allowed to cool. There results a stiffly flexible structure of glass fibers carrying polymerizable resin and weighing approximately 13 ounces per square foot of which approximately 65% is glass and 35% is uncured resin composition. Such structures may be laid up in laminae or cut to desired shapes and formed in positive molds and subjected to curing temperatures under pressure to yield reinforced plastic sheets or molded objects of great strength and utility.

Obvious variations from the detailed instructions given in the examples may be practiced. Adaptation to the formation of continuous webs of resin bearing glass fiber structure is contemplated within the purview of the invention. If no liquid cross linking agent is to be employed or if the amount employed is insufficient to moisten the fibers and prevent sifting through of the powdered resin a small proportion of volatile liquid may be sprayed along with the fibers to cause temporary adherence of the powder, which liquid will be driven off during the fusion step.

The structures of the present invention are adapted to the production of many useful articles. Laid up in flat sheets and subjected to curing conditions they may be converted directly into such articles as wall panels, table tops, shelving, and the like. Trays, suitcase halves, and similar shaped articles may likewise be produced from resin loaded glass fiber structures in sheet form since they are sufficiently flexible to conform to molds of simple design. More intricately shaped articles are better prepared by forming the structures on screens shaped roughly like the finished article whereby the structure is not subjected to localized drawing forces when pressed into a mold. Seat forms, tubs and other deep vessels, housings for electrical equipment, and the like are conveniently prepared by this technique.

What is claimed is:

1. A superficially dry, pliable mat consisting essentially of glass fibers and, in adherent relation thereto a dry solid, fusible, curable resin composition comprising a solid pulverulent polymerizable polyester of melting point at least 80° C., and a minor proportion of a vinyl polymerization catalyst said polyester being the esterification product of an ethene dicarboxylic acid with a substantially stoichiometric quantity of a polyhydric alcohol selected from the group consisting of (a) dihydric alcohols conforming to the formula

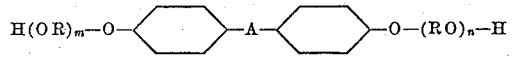

wherein R is an alkylene radical containing from 2 to 3 carbon atoms, A is a 2-alkylidene radical containing from 3 to 4 carbon atoms, $m$ and $n$ are each at least one, and the average sum of $m+n$ is not over 3; and (b) mixtures consisting of at least 50 mol percent of a dihydric alcohol conforming to the said formula, from 0 to 50 mol percent of a member of the group ethylene glycol, diethylene glycol and propylene glycol, and from 0 to 10 mol percent of a polyhydric alcohol containing from 3 to 6 carbon atoms and at least three hydroxyl groups, the proportion of said curable resin composition to glass fiber being sufficient to form, upon subjection of the mat to heat and pressure alone, a hard, dense, glass-reinforced, thermoset solid.

2. A mat as in claim 1 wherein the said glass fibers comprise from 35% to 65% of the structure and the said resin composition comprises from 65% to 35% thereof.

3. A mat as in claim 2 wherein the said solid curable resin composition contains a non-volatile cross-linking agent.

4. A mat as in claim 2 wherein the said curable resin composition contains from 0% to 20% by weight of a diallyl ester of a dibasic organic acid.

5. A mat as in claim 4 wherein the said high melting polyester is the fumarate of 2.2-di-(4-hydroxy propoxy phenyl)-propane.

6. A mat as in claim 5 wherein the said diallyl ester is diallyl phthalate and comprises about 10% by weight of the said curable resin composition.

7. A mat as in claim 4 wherein the said high melting polyester is the fumarate of a dihydric alcohol mixture consisting of 50 mol percent 2.2-di-(4-hydroxy propoxy phenyl)-propane and 50 mol percent ethylene glycol.

8. A mat as in claim 7 wherein the said diallyl ester is diallyl phthalate and comprises about 10% by weight of said curable resin composition.

9. The process for producing a curable resin bearing structure of glass fibers which comprises the steps of forming a mat of glass fibers, incorporating therein a powdered to granular polymerizable polyester of melting point above 80° C., which is the esterification product of an ethene dicarboxylic acid with a substantially stoichiometric quantity of a polyhydric alcohol selected from the group consisting of (a) dihydric alcohols conforming to the formula

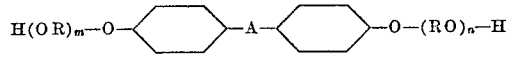

wherein R is an alkylene radical containing from 2 to 3 carbon atoms, A is a 2-alkylidene radical containing from 3 to 4 carbon atoms, $m$ and $n$ are each at least one, and the average sum of $m+n$ is not over 3; and (b) mixtures consisting of at least 50 mol percent of a dihydric alcohol conforming to the said formula, from 0 to 50 mol percent of a member of the group ethylene glycol, diethylene glycol and propylene glycol, and from 0 to 10 mol percent of a polyhydric alcohol containing from 3 to 6 carbon atoms and at least three hydroxyl groups, and a minor proportion of a vinyl polymerization catalyst, and subjecting the mat and incorporated polyester-catalyst mixture to a temperature above the melting point of the polyester and below the polymerizing temperature of the catalyzed resin for a sufficient time to fuse the polyester particles; the proportion of polyester so incorporated being sufficient to form, upon subjection of the said structure to heat and pressure alone, a hard, dense, glass-reinforced, thermoset solid.

10. The process of claim 9 wherein the proportion of said polyester so incorporated lies between 35% and 65% of the structure by weight.

11. The process for producing a polymerizable resin bearing structure of glass fibers which comprises the steps of forming a mat of glass fibers in random orientation, incorporating a powdered to granular solid polymerizable polyester of melting point at least 80° C., a liquid non-volatile cross linking agent, and a minor proportion of a vinyl polymerization catalyst therein, and subjecting the mat and incorporated ingredients to a temperature above the melting point of said polyester and below the polymerization temperature of the mixed incorporated ingredients for a sufficient time to fuse the polyester particles; the proportion of said cross linking agent to said polyester being insufficient to render the fused resin composition tacky, and the sum of the polyester and cross linking agent comprising from 35% to 65% by weight of the total structure.

12. The process of claim 11 wherein the said polyester is the fumarate of 2.2 di-(4-hydroxy propoxy phenyl)-propane and the said cross linking agent is diallyl phthalate.

13. The process of claim 11 wherein the said polyester is the fumarate of a mixed dihydric alcohol consisting of 50 mol percent 2.2-di-(4-hydroxy propoxy phenyl)-propane and 50 mol percent ethylene glycol, and the said cross linking agent is diallyl phthalate, the cross linking agent being present in amount no greater than 20% by weight of the sum of said cross linking agent and said polyester.

References Cited in the file of this patent

UNITED STATES PATENTS

| 2,277,049 | Reed | Mar. 24, 1942 |
| 2,288,072 | Collins | June 30, 1942 |
| 2,505,347 | Brucksch | Apr. 25, 1950 |
| 2,528,235 | Loritsch | Oct. 31, 1950 |
| 2,543,101 | Francis | Feb. 27, 1951 |
| 2,550,465 | Gorski | Apr. 24, 1951 |
| 2,602,037 | Nelb | July 1, 1952 |
| 2,634,251 | Kass | Apr. 7, 1953 |
| 2,662,069 | Kass | Dec. 8, 1953 |
| 2,662,070 | Kass et al. | Dec. 8, 1953 |

FOREIGN PATENTS

| 627,255 | Great Britain | Aug. 4, 1949 |